United States Patent [19]

Maughan et al.

[11] Patent Number: 5,365,388
[45] Date of Patent: Nov. 15, 1994

[54] DISK DRIVE CONSTRUCTED TO ISOLATE MOTOR VIBRATION

[75] Inventors: Stuart Maughan, Bountiful; Earl Bryner, Roy, both of Utah

[73] Assignee: Iomega Corporation, Roy, Utah

[21] Appl. No.: 52,827

[22] Filed: Apr. 23, 1993

Related U.S. Application Data

[63] Continuation of Ser. No. 759,487, Sep. 13, 1991, abandoned.

[51] Int. Cl.⁵ .................. G11B 17/02; G11B 33/14; G11B 33/08
[52] U.S. Cl. .................. 360/99.04; 360/99.08; 360/97.04; 360/97.01
[58] Field of Search .............. 360/86, 97.01, 99.12, 360/98.01–98.08, 105, 106, 97.02, 97.04, 99.01, 99.04; 369/261, 270; 310/71, 152, DIG. 6, 67 R, 51

[56] References Cited

U.S. PATENT DOCUMENTS

| | | | |
|---|---|---|---|
| 4,600,955 | 7/1986 | Regruit | 360/109 |
| 4,669,004 | 5/1987 | Moon et al. | 360/109 |
| 4,740,851 | 4/1988 | Jones et al. | 360/109 |
| 4,743,989 | 5/1988 | Bauck et al. | 360/109 |
| 4,757,406 | 7/1988 | Stewart et al. | 360/109 |
| 4,783,705 | 11/1988 | Moon et al. | 360/109 |
| 4,794,480 | 12/1988 | Jones et al. | 360/109 |
| 4,855,849 | 8/1989 | Jones et al. | 360/109 |
| 4,901,173 | 2/1990 | Jones et al. | 360/109 |
| 4,930,029 | 5/1990 | Morita | 360/98.01 |
| 4,965,476 | 10/1990 | Lin | 310/51 |
| 4,985,792 | 1/1991 | Moir | 360/97.01 |
| 5,010,133 | 4/1991 | Seville | 524/871 |
| 5,027,242 | 6/1991 | Nishida et al. | 360/97.01 |
| 5,034,837 | 7/1991 | Schmitz | 360/109 |
| 5,040,764 | 8/1991 | Dubois | 248/635 |
| 5,079,655 | 1/1992 | Yagi | 360/97.01 |
| 5,097,366 | 3/1992 | Ueki | 360/97.02 |
| 5,150,267 | 9/1992 | Reinisch | 360/97.02 |

FOREIGN PATENT DOCUMENTS

| | | | |
|---|---|---|---|
| 62-279586 | 12/1987 | Japan | 360/97.01 |
| 62-279587 | 12/1987 | Japan | 360/97.01 |

OTHER PUBLICATIONS

"Cellular Urethanes Find High Tech Use in the Drive", Plastics World, Jul. 1991, p. 26.

*Primary Examiner*—Stuart S. Levy
*Assistant Examiner*—Craig A. Renner
*Attorney, Agent, or Firm*—Woodcock Washburn Kurtz Mackiewicz & Norris

[57] ABSTRACT

A disk drive has a stator positioner disposed on a shoulder of a drive shaft housing which is part of the spicule. The positioner secures the stator against movement and references the motor to the spicule which engages and guides the cartridge. An open-celled urethane gasket between the printed circuit board and the stator absorbs vibrational forces.

9 Claims, 5 Drawing Sheets

DISK DRIVE CONSTRUCTED TO ISOLATE MOTOR VIBRATION This is a continuation of application Ser. No. 07/759,487, filed Sep. 13, 1991, now abandoned.

BACKGROUND OF THE INVENTION

This invention relates to magnetic disk drives, and more particularly, to the mounting of the drive motor for a disk drive used with a flexible magnetic disk contained in a rigid cartridge having a Bernoulli surface against which the disk is rotated.

"Flexible" or "floppy" disks are frequently used as a magnetic storage medium because of their portability and low cost. These disks are called "floppy" because they tend to sag away from their center when not otherwise supported. The space between a magnetic disk and the transducer is critical for proper non-contact data recording and pick-up. Certain disks flatten and stabilize the floppy disk during the read/write operation by rotating the disk at high speeds in close juxtaposition to a flat plate sometimes called a Bernoulli plate. In this way, an air bearing is formed between the plate and disk such that the gap between the record surface and the plate is held constant. U.S. Pat. Nos. 4,743,989—Bauck, et al; 4,794,480—Jones, et al; 4,740,851—Jones, et al; 4,855,849—Jones, et al; and 4,901,173—Jones, et al describe such disk drives.

U.S. Pat. No. 4,740,851—Jones, et al describes a disk drive of this type in which the major components are referenced to a spicule member. The spicule provides a reference for the transducers with respect to the cartridge and disk.

The aforementioned U.S. Pat. No. 4,855,849—Jones, et al describes a disk drive in which the motor is mounted on the printed circuit board. These disk drives are somewhat noisy, in part because of vibration from the spinning of the motor rotor. This vibration is transferred through the motor stator to the printed circuit assembly, which amplifies the sound.

It is an object of the present invention to provide an improved disk drive in which vibration is reduced.

SUMMARY OF THE INVENTION

In accordance with the present invention, a stator positioner is placed over the spindle and sits on the shoulder of the motor housing which is a part of the spicule of the disk drive. The stator positioner is a stiff microcellular urethane in the shape of a square-cornered flat circular band. The stator positioner creates the needed alignment of the stator with respect to the other components of the disk drive.

In accordance with the invention, a stator gasket made of a vibration-absorbing microcellular urethane is placed between the stator and the printed circuit board. The stator gasket acts as a non-rigid mechanical coupling device. When the motor is mounted in this way, the motor occasionally drifts. When the drive is placed on its side, there is a potential for the motor to drift from its original placement about the axis of the spindle. This drift would eventually allow contact between the stator and the rotor. The stator positioner prevents motor drift. When the disk drive is placed on its side, the stator does not drift, thereby avoiding potential contact between the stator and the rotor. Both the stator positioner and the stator gasket isolate the vibrational forces produced by the motor, thereby significantly reducing the noise level of the disk drive.

The gasket has a layer of adhesive on both sides. When assembled, the adhesive couples the stator to the printed circuit board. The adhesive coated gasket has advantages in the assembly process over the prior art technique of gluing the stator to the printed circuit board.

DESCRIPTION OF THE PREFERRED EMBODIMENT

Figure 1:
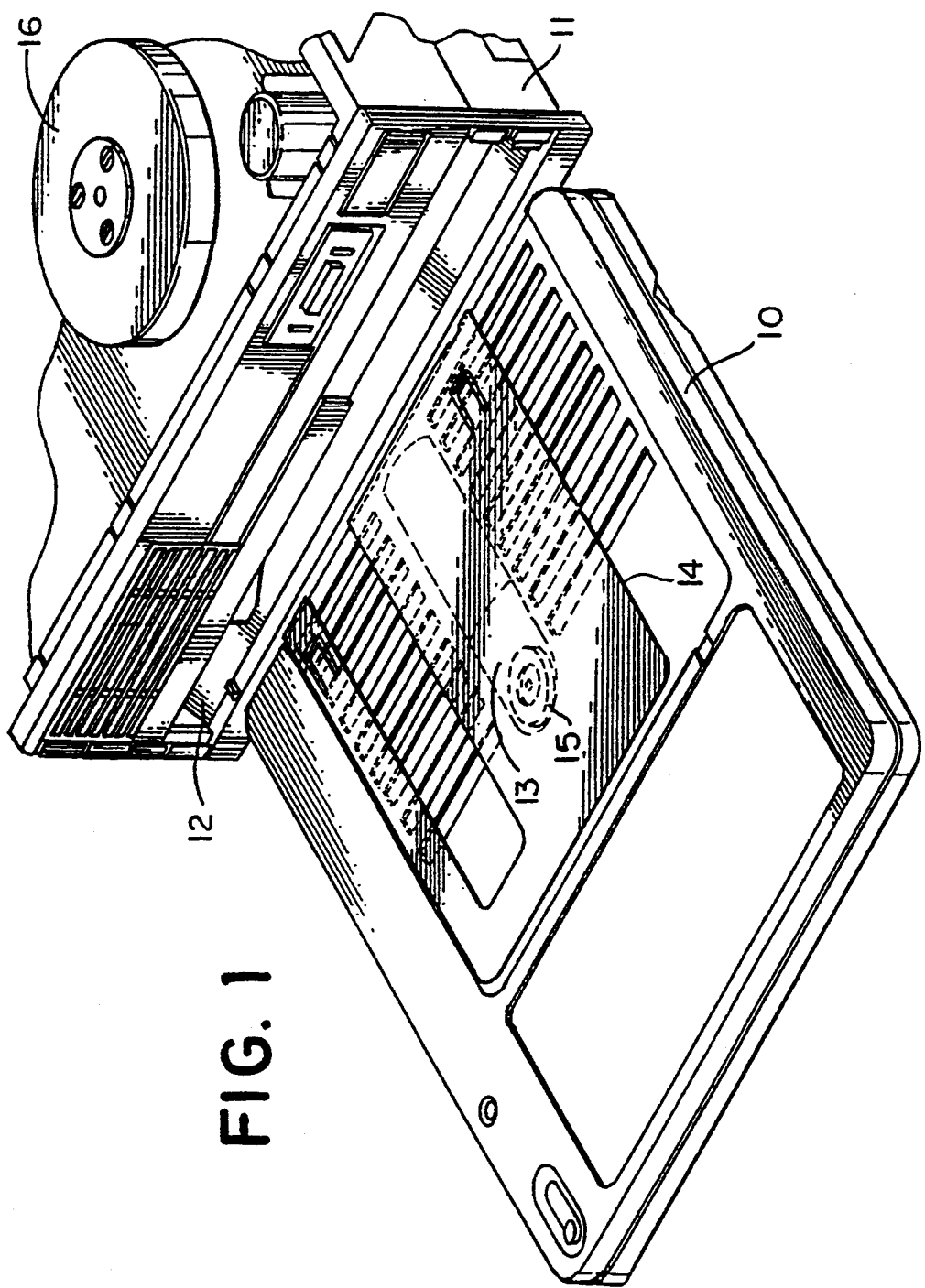
FIG. 1 is a cut away perspective view of a disk drive on which this invention is an improvement.

FIGS. 1–4 show the disk drive on which the present invention is an improvement. Referring to FIG. 1, floppy disk cartridge 10 is shown in a top perspective view as it is about to enter disk drive chassis 11 through slot 12 in the front face of the disk drive chassis. Floppy disk 13 is enclosed by cartridge 10 and is revealed in phantom as indicated by the dashed lines. Cartridge cover 14 normally protects the floppy disk cartridge when not in use, but is displaced to the right upon insertion of the cartridge into the disk drive whereupon floppy disk hub 15 rotatably engages the drive spindle. Rotor-bell 16 provides rotational inertia to the drive spindle.

Figure 2:
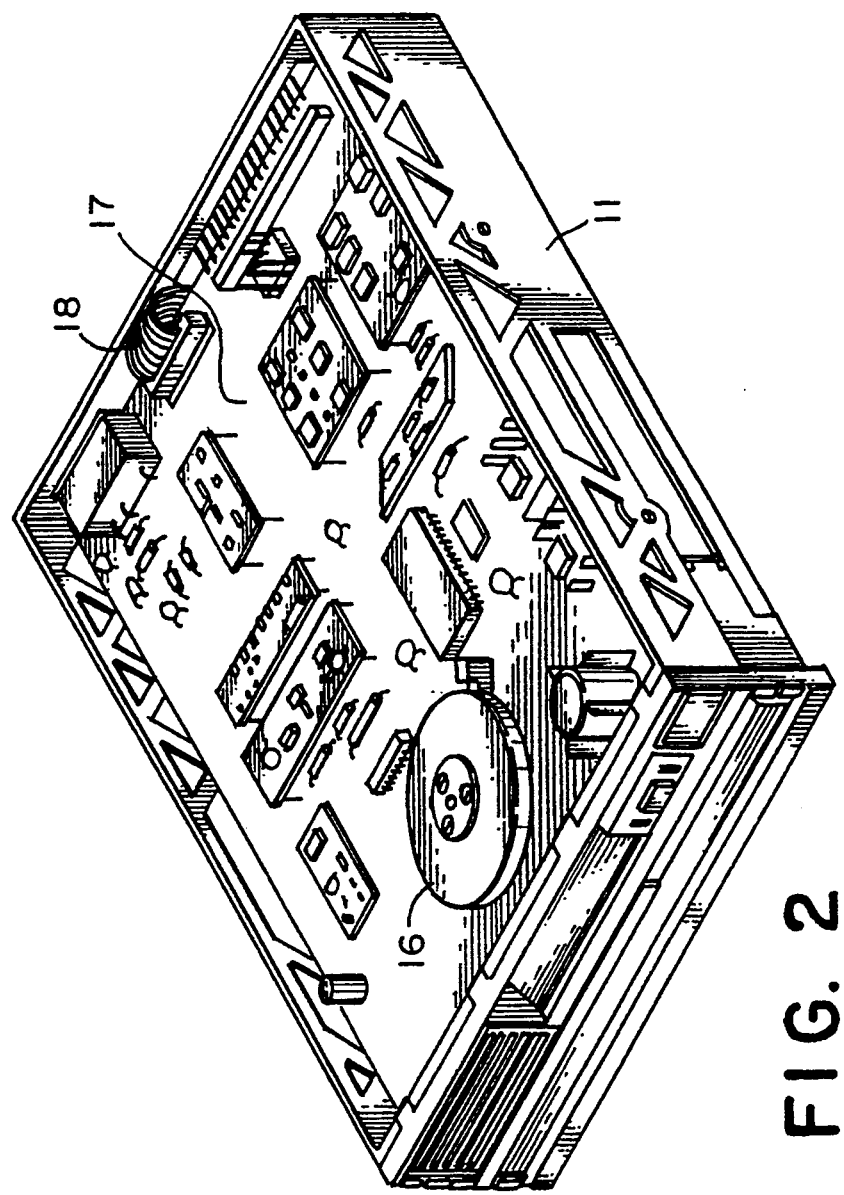
FIG. 2 is a perspective view from above showing the printed circuit board and the top portion of the motor rotor.

FIG. 2 shows the printed circuit board 17 contained within the chassis. During operation, electrical power is supplied to the printed circuit board through electrical harness 18. Various electrical components are connected to the circuit printed on the under-side of printed circuit board 17.

Figure 3:
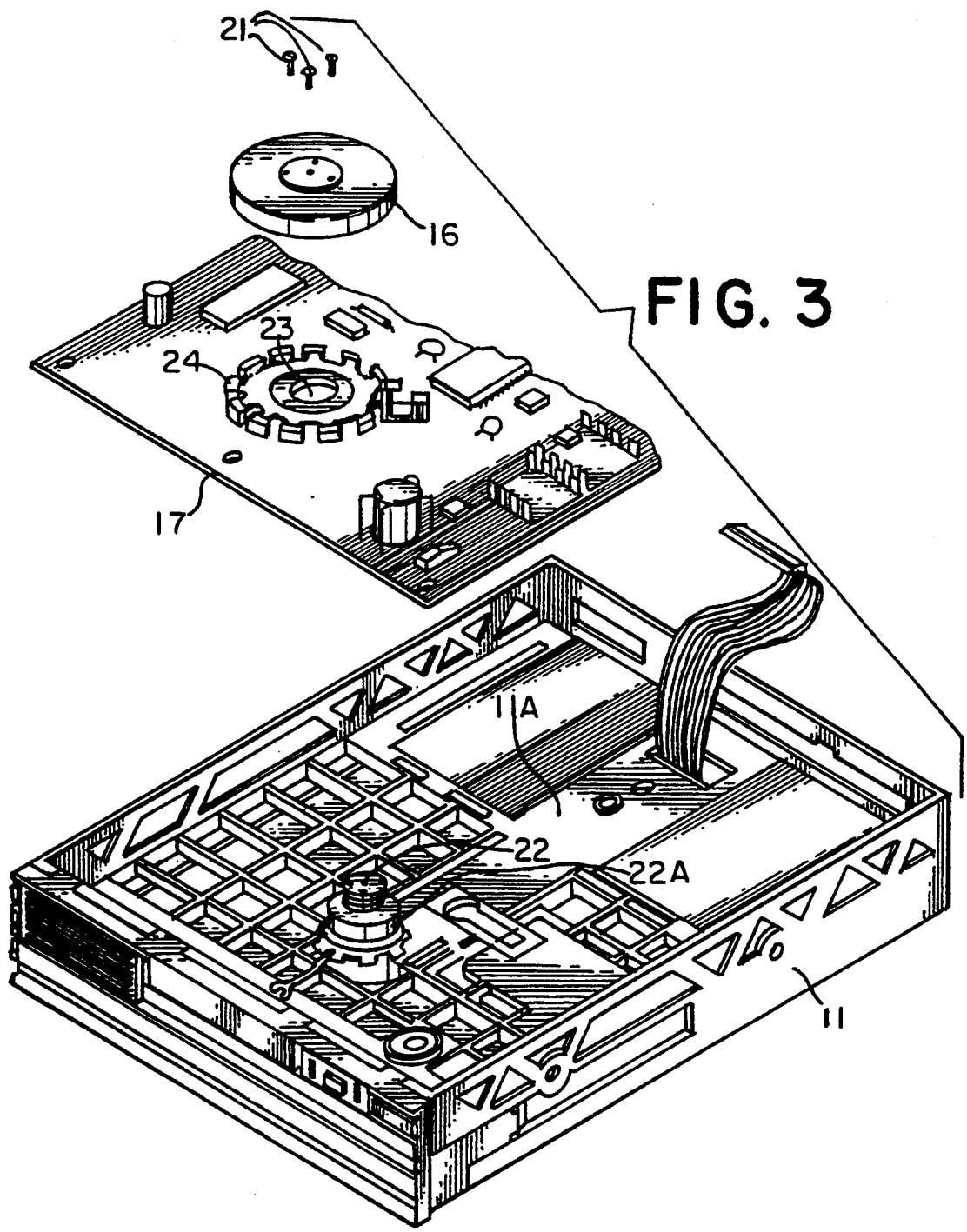
FIG. 3 is an exploded view from above showing the motor rotor and the printed circuit board displaced from their normal mounted positions in the disk drive, thus revealing the upper portion of the drive shaft and drive spindle.
Figure 4:
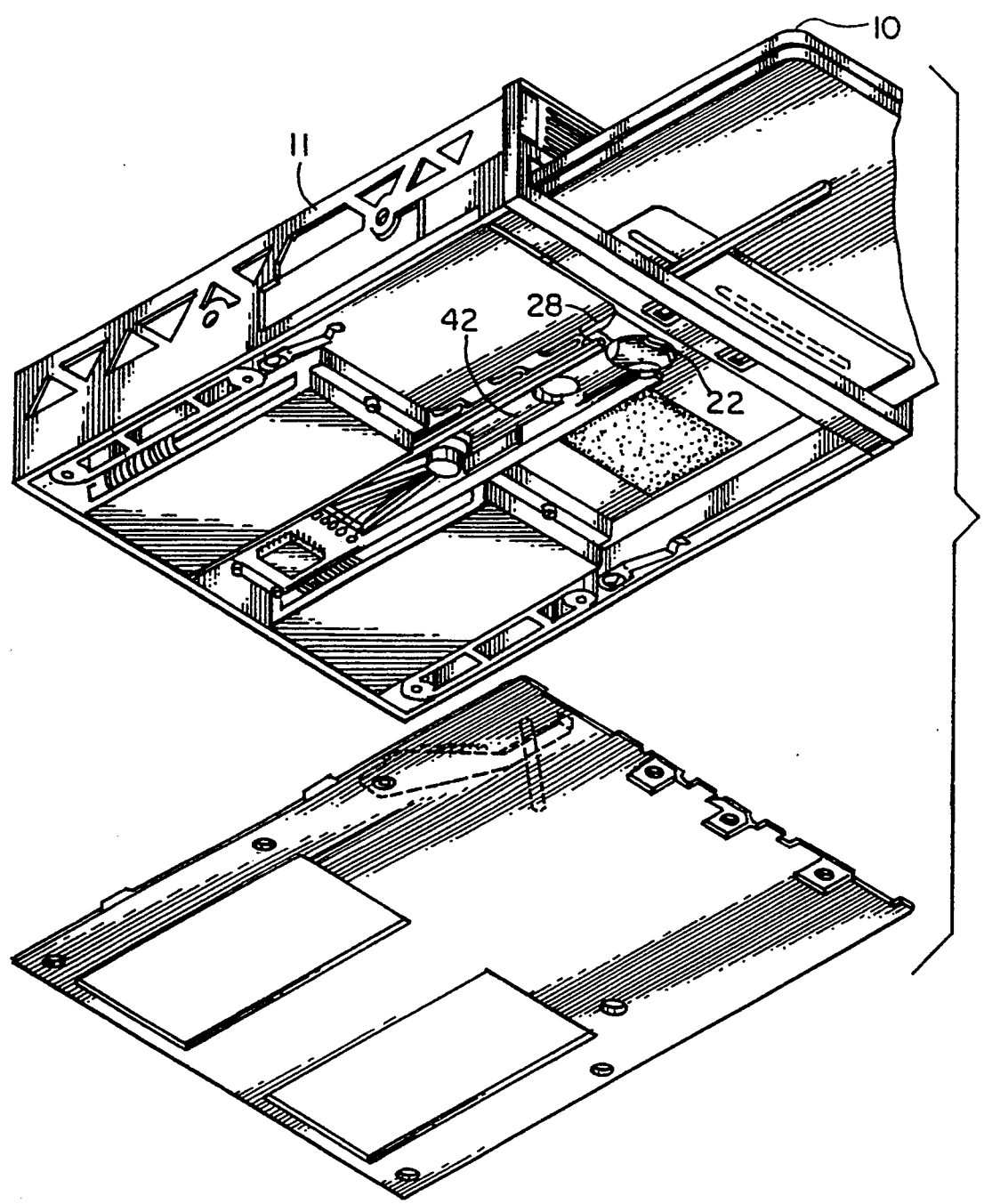
FIG. 4 is an exploded perspective view from below the disk drive showing the drive spindle and the spicule member to which it is mounted.

As shown in FIG. 3, hold down screws 21 secure rotor bell 16 to a flange which is mounted to drive shaft 22, the lower portion of which is rotatably contained within drive shaft housing 22A. The drive shaft housing 22A is an integral portion of the spicule member 42 (FIG. 4). The major portion of the spicule member 42 is contained below chassis bed 11A. As best shown in FIG. 4, the drive spindle 28 is rotatably mounted to spicule member 42 for rotation by drive shaft 22, the lower portion of which is attached to the drive spindle.

The spicule member is more fully shown in U.S. Pat. No. 4,740,851—Jones, et al. Spicule member 42 serves as a back-bone for the major components of the disk drive. It positions the disk cartridge in the region where the read/write operations take place on the disks in juxtaposition to the Bernoulli surface in the inside top of the cartridge. Both sides of spicule member 42 contain a slot running substantially the entire length of the member. The slot is of substantially the same width in the plane surface as the cartridge reference rails.

Drive spindle 28 is contained within the lower portion of drive shaft housing 22A. As more fully described in U.S. Pat. No. 4,901,173—Jones, et al, when a record disk cartridge 10 is inserted into the disk drive of this invention, the drive spindle 28 couples with the disk hub 15. Actuation of the drive motor herein described will then cause rotation of the disk 13.

Figure 5:
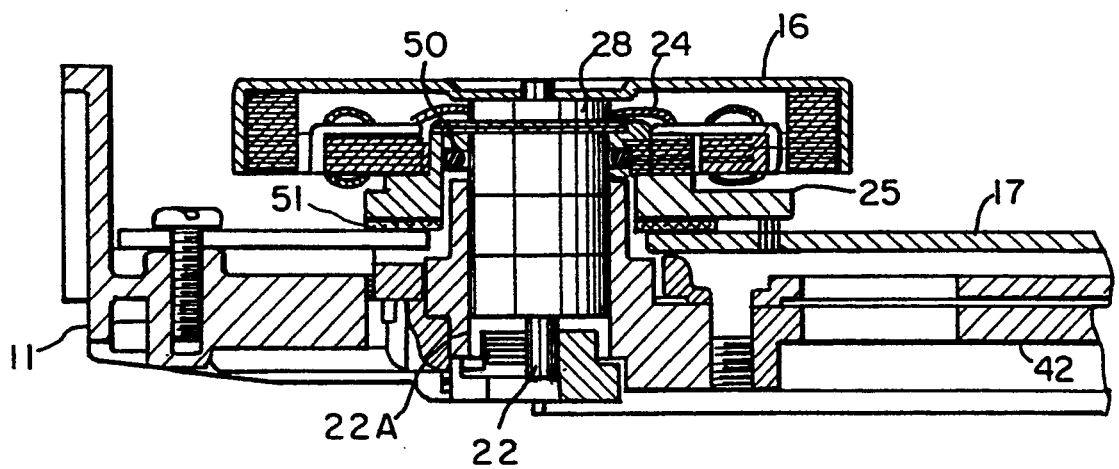
FIG. 5 is a cross-section showing the stator positioner and the gasket of the present invention.

FIG. 5 is a cross-section showing the chassis 11, rotor 16, printed circuit board 17, shaft 22, spindle housing 22A, stator 24, stator spacer 25, spindle 28, and spicule 42 of the disk drive just described.

FIG. 5 also shows the stator positioner 50 and stator gasket 51 of the present invention.

Figure 6A:
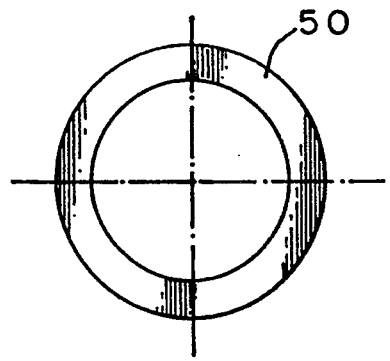
FIGS. 6A and 6B are plan and edge views, respectively, of the stator positioner of the present invention.
Figure 6B:
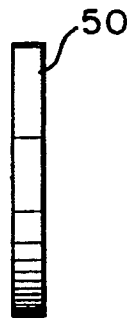

FIGS. 6A and 6B show the stator positioner 50. The stator positioner 50 is made of a stiff microcellular urethane which is available under the tradename INDUR-C ® supplied by Rogers Corporation, Rogers, Conn. The stator positioner 50 is a square-cornered flat circular band which is placed over the spindle 28 and sits on the shoulder of drive shaft housing 22A which is a part of the spicule 42. The stator 24 is placed over the stator positioner 50 thereby providing the needed alignment. Because of the stiffness of the INDUR-C ® material, when the disk drive is placed on its side, the stator does not drift. Because the stator positioner 50 is placed on the shoulder of a part of the spicule 42, the stator is referenced to the spicule which provides a reference for the other major components of the disk drive. The spicule member 42 contains reference surfaces which are a precise predetermined distance from the surface of drive spindle 28. When cartridge 10 is inserted into the disk drive, rails in cartridge 10 engage the reference surface on the spindle. This insures continued and firm contact between the reference rails and the Bernoulli surface while the cartridge is within the disk drive as disclosed in U.S. Pat. Nos. 4,901,173 and 4,794,480. This interaction between the reference rails and the Bernoulli surface assures proper planar alignment between the disk pair, the transducers, the Bernoulli surface, and the motor.

The vibration absorbing characteristics of the microcellular urethane contributes to the noise suppression of the present invention.

Figure 7A:
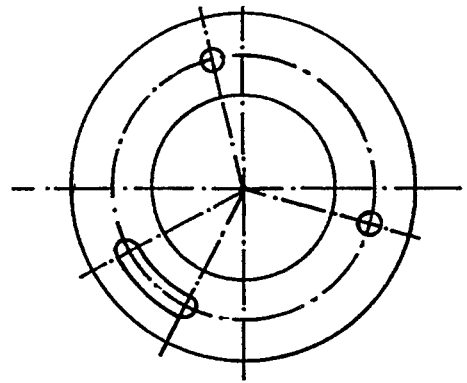
FIGS. 7A and 7B are plan and edge views, respectively, of the gasket of the present invention.
Figure 7B:

FIG. 5 also shows the stator gasket 51 of the present invention. The gasket is shown in FIGS. 7A and 7B. The stator gasket 51 is a disk made of open-celled urethane. As one example, the urethane Poron supplied by Rogers Corporation, Rogers, Conn. was used. A layer of a non-setting, or non-hardening, adhesive is applied to either side of the gasket. Alternatively, a double coated acrylic foam tape may be used to form the gasket. For example, the tapes identified as 3-M VHB 4945, or 4946 or, 4941 may be used.

This assembly has several advantages over the previously used technique of gluing. The prior art gluing processes brought about several problems: 1) Excess glue migration on the printed circuit board. 2) Un-desirable cure times. 3) Labor intensive. The double coated gasket with non-setting adhesive of the present invention eliminated the problems while also enhancing rework procedures. Previously, to remove the stator, the glue had to be soaked in a solvent for several minutes. The invention allows the motor to be removed in seconds.

The stator gasket 51 of the present invention allows the forces produced by the motor to be absorbed, rather than coupled, to the printed circuit board. The adhesive holds the gasket to the stator positioner 25 and to the printed circuit board 17.

By isolating the vibrational forces produced by the motor, the sound level of the disk drive has been reduced by about 10 db.

While a particular embodiment of the invention has been shown and described, various modifications are within the true spirit and scope of the invention. The appended claims are, therefore, intended to cover all such modifications.

What is claimed is:

1. A disk drive for writing and reading data to and from a magnetic disk contained in a rigid cartridge comprising:
    a chassis;
    a spicule member mounted on said chassis, said spicule member engaging and guiding said cartridge with respect to said disk drive;
    a drive spindle for driving said magnetic disk;
    said spicule member having a drive shaft housing in which said spindle is rotatably mounted;
    a stator having a plurality of stator windings and a central aperture disposed about said spindle;
    a rotor coupled to said spindle and inductively disposed about said stator; and
    a shock-absorbing stator positioner disposed around a substantial portion of a shoulder of said drive shaft housing, said stator being placed over said positioner, said positioner securing said stator against movement, said positioner being a stiff microcellular urethane material.

2. The disk drive recited in claim 1 wherein said stator positioner is a flat circular band positioned around said spindle.

3. The disk drive recited in claim 1 further comprising:
    a printed circuit board mounted on said chassis, said printed circuit board being disposed between said chassis and said stator, said printed circuit board having a printed circuit thereon and an aperture through which said drive shaft housing passes; and
    an open celled urethane gasket between said printed circuit board and said stator, said open celled urethane gasket absorbing the vibrational forces in the disk drive.

4. The disk drive recited in claim 3 wherein said gasket is coated with a layer of adhesive on both sides, said adhesive layers bonding said printed circuit board to said stator.

5. The disk drive recited in claim 1 further comprising:
    read/write heads; and
    a Bernoulli surface on said magnetic disk, said spicule member positioning said Bernoulli surface with respect to said read/write heads and said stator positioner positioning said stator with respect to said spicule member.

6. A magnetic disk drive for writing and reading data to and from a magnetic disk contained in a rigid cartridge, comprising:
    a chassis;
    a spicule member mounted on said chassis, said spicule member engaging and guiding said cartridge with respect to said disk drive;

a drive spindle rotatably supported by said chassis for driving the magnetic disk, said spicule member having a drive shaft housing in which said drive spindle is rotatably mounted;

a drive shaft rotatably engaging said drive spindle;

a stator having a plurality of stator windings and a central aperture disposed about said drive shaft;

a printed circuit board mounted on said chassis, said printed circuit board being disposed between said chassis and said stator, said printed circuit board having a printed circuit thereon and an aperture through which said drive shaft passes;

a stator spacer disposed between said stator and said printed circuit for aligning said stator with respect to said drive spindle, a shock-absorbing stator positioner disposed around a substantial portion of a shoulder of said drive shaft housing, said stator being placed over said positioner, said positioner securing said stator against movement, said position being a stiff microcellular urethane material;

a bell rotor mounted to the drive shaft and inductively disposed about said stator; and an open celled urethane gasket between said printed circuit board and said stator spacer, said open celled urethane absorbing vibrational forces produced by said rotor.

7. The disk drive recited in claim 6 wherein said gasket is coated with a layer of adhesive on both sides, said adhesive layers bonding said printed circuit board to said stator.

8. The disk drive recited in claim 7 wherein said adhesive is non-setting.

9. The disk drive recited in claim 6 wherein said gasket is made of a double-coated acrylic foam tape.

* * * * *